May 16, 1939. M. P. FLAHERTY 2,158,750
FLUSH TANK CONTROL
Filed Nov. 26, 1937
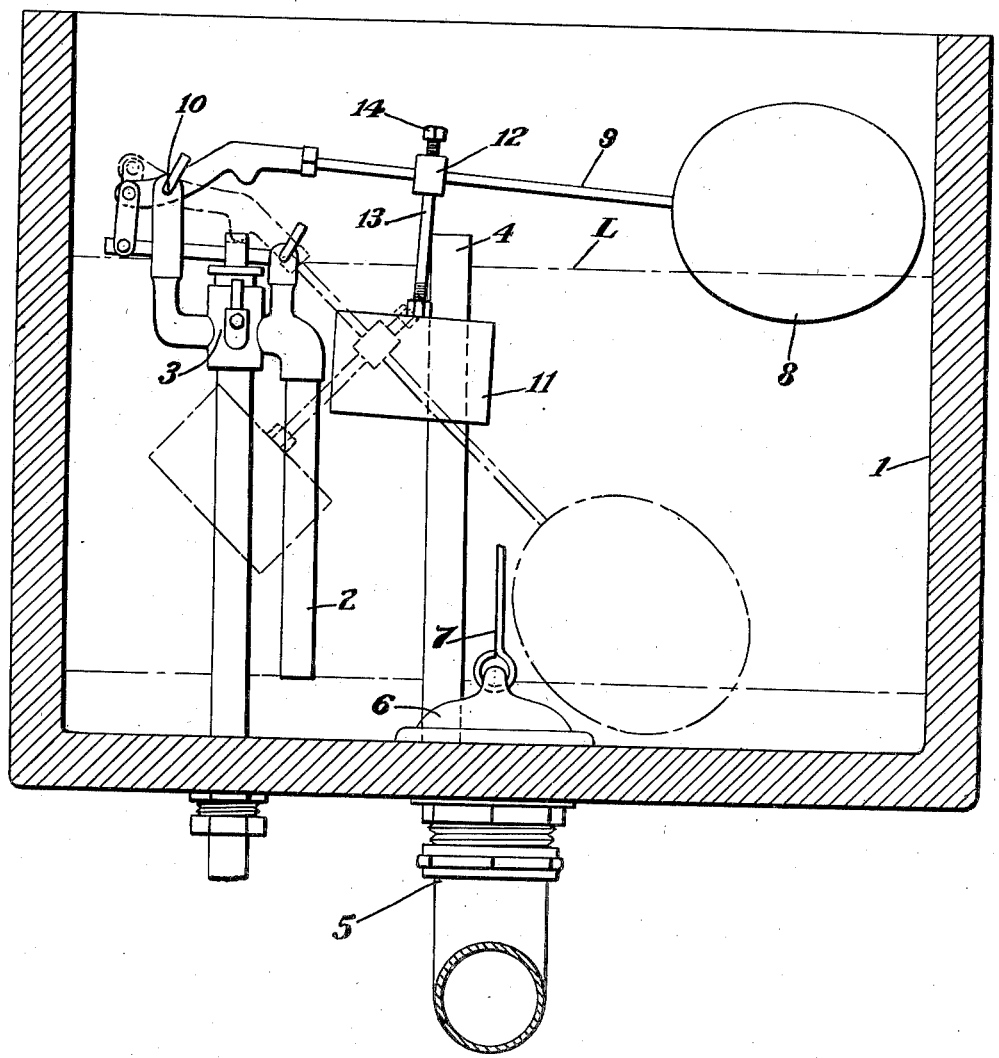
Inventor
Michael P. Flaherty
by
Spear Rawlings & Spear
Attorneys Patented May 16, 1939

2,158,750

UNITED STATES PATENT OFFICE 2,158,750

FLUSH TANK CONTROL

Michael P. Flaherty, Quincy, Mass.

Application November 26, 1937, Serial No. 176,456

1 Claim. (Cl. 137—104)

This invention relates to float controlled valves, such, for example, as those employed in feeding or flushing devices.

In these widely used devices, the principal sources of difficulty are related to the causes and effects of wear of the float controlled valve.

In most devices of the sort under consideration, there exists one definite source of valve wear with the elimination of which my invention is concerned. This source is evidenced by the lack of a definite and complete valve closure when the desired water level in the tank has been reached. This is due in general to the fact that the float is subject to wave action and as the desired water level is approached, the wave action may cause the valve to be opened or shut several times before the final closing with consequent excessive wearing of the valve.

Valve leakage, in many instances, is attended by waste of water through the overflow pipe. Before resorting to replacement of the worn valve elements, improvised corrections are effected by bending the arm carrying the float so that at a lower water level the float will be influenced to offset the valve wear. It has been proposed to accomplish the same general effect by the use of adjustable weights by which the buoyancy effect of the float could be varied as required.

These corrections of valve trouble are objectionable in that they are only temporary and are effected by manual adjustment. Even if made so that the water level may raise the float considerably without loss of water through the overflow to offset valve wear, the float and consequently the valve will still be subject to fluctuation with the wave action in the tank.

It should also be noted that, particularly in flush tanks, a predetermined volume of water is desired and that any substantial change in the water level resulting from bending the arm under the control of the float will change that volume and water wastage may result as a consequence of that volume being less than or in excess of the predetermined volume.

In accordance with my invention, I provide for a positive closing of the valve and an automatic take-up of valve wear without materially varying the desired water level. I accomplish this result by the use of an auxiliary float device which cooperates with the main float after the tank is partially refilled and becomes dominant thereof when the desired water level in the tank is attained. At this time my auxiliary float is preferably submerged so that it is unaffected by surface turbulence.

In the accompanying drawing, I have illustrated a simple embodiment of my invention mounted on the float controlled valve operating arm of a suggested flush tank.

A typical tank is shown at 1 and has an inlet 2 controlled by the valve indicated at 3. While details of construction are not essential to the understanding or the operation of my invention I have shown an overflow 4, an outlet 5, its valve 6, and a fragment of its operating linkage at 7.

The usual float 8 is mounted on the arm 9 pivotally mounted as at 10 to operate the valve 3.

My auxiliary device consists of a preferably cylindrical float 11 into which and a collar 12 is threaded a rod 13. The collar 12 is slidably mounted on the arm 9 but may be locked in any desired position thereon by means of the set screw 14.

The exact location of my auxiliary device is dependent on the characteristics of the tank 1 and whether its axis is in vertical alignment with the arm 9 as shown or not depends on the available space in the tank 1. In practice, however, I have found that the most satisfactory location of my device is with the collar 12 as close to the valve 3 as possible, say 2½ inches, to offset any bending of the arm 9 which is of readily bendable stock and therefore subject to and affected by the full leverage of the arm 9 under the influence of the float 8. The rod 13 is preferably of sufficient length so that the float 11 is submerged when the desired water level L is attained.

The float 11 has sufficient flotation power so that when submerged or partially submerged, the buoyant force of the water permits it to be dominant of the float 8 to hold closed the valve 3.

In operation, when the tank 1 has been emptied and the valve 6 again closes the outlet 5, the float 8 is substantially in the dotted line position and the float 11 is remote from the water. When the water level in the tank 1 rises so that the float 11 is effected by the water, it becomes cooperative with the float 8. Since, however, its maximum buoyancy is required to dominate the main float 8 and since this maximum buoyancy is attained only when it is submerged, the float 8 remains dominant until the water level approaches the level L at which level the float 11 is submerged. Since the float 11 is submerged and not subject to wave action valve wear is minimized and offset as it occurs.

What I therefore claim and desire to secure by Letters Patent is:

In a flush tank structure including a tank, a valve for controlling inlet of liquid to said tank, a pivoted arm operatively connected with said valve, a main float carried by said arm and upon which liquid, by rise of its level in the tank, acts to swing said arm to close said valve and to maintain said valve closed, and an auxiliary float carried by said arm and disposed to be submerged in the liquid and to exert a steadying force upon said arm during final closing movement of the valve and when the valve is maintained closed primarily by the buoyant action of the liquid upon the main float.

MICHAEL P. FLAHERTY.